(12) United States Patent
Elizarov et al.

US009281947B2

(10) Patent No.: US 9,281,947 B2
(45) Date of Patent: Mar. 8, 2016

(54) SECURITY MECHANISM WITHIN A LOCAL AREA NETWORK

(75) Inventors: Michael Elizarov, Sammamish, WA (US); Eldar Musayev, Sammamish, WA (US); Neil Fishman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1693 days.

(21) Appl. No.: 12/018,783

(22) Filed: Jan. 23, 2008

(65) Prior Publication Data

US 2009/0187760 A1 Jul. 23, 2009

(51) Int. Cl.
*H04L 9/32* (2006.01)
*H04L 29/06* (2006.01)

(52) U.S. Cl.
CPC ............ *H04L 9/3263* (2013.01); *H04L 9/3273* (2013.01); *H04L 63/0823* (2013.01); *H04L 63/20* (2013.01); *H04L 2209/56* (2013.01); *H04L 2209/80* (2013.01)

(58) Field of Classification Search
CPC ... H04L 63/0823; H04L 63/20; H04L 9/3263; H04L 9/3273
USPC ........... 713/156–158, 168, 175; 380/277, 282
See application file for complete search history.

(56) References Cited

U.S. PATENT DOCUMENTS

| | | | |
|---|---|---|---|
| 5,357,571 A | 10/1994 | Banwart | |
| 6,233,341 B1 * | 5/2001 | Riggins | ........................ 380/277 |
| 6,324,645 B1 | 11/2001 | Andrews et al. | |
| 6,370,250 B1 | 4/2002 | Stein | |
| 6,424,718 B1 | 7/2002 | Holloway | |
| 6,754,829 B1 * | 6/2004 | Butt et al. | .......................... 726/8 |
| 6,801,998 B1 * | 10/2004 | Hanna et al. | ................... 713/155 |
| 7,170,999 B1 * | 1/2007 | Kessler et al. | ................. 380/277 |
| 7,206,936 B2 | 4/2007 | Aull et al. | |
| 7,269,726 B1 | 9/2007 | Corella | |
| 7,418,597 B2 * | 8/2008 | Thornton et al. | .............. 713/175 |
| 7,975,139 B2 * | 7/2011 | Coulier | ............... H04L 63/0435 |
| | | | 713/168 |
| 8,161,547 B1 * | 4/2012 | Jennings et al. | ................. 726/22 |
| 8,495,375 B2 * | 7/2013 | Sherkin | ................. H04L 9/3066 |
| | | | 380/283 |
| 8,646,070 B1 * | 2/2014 | Patsenker et al. | ................ 726/22 |
| 2005/0081026 A1 * | 4/2005 | Thornton et al. | .............. 713/156 |
| 2005/0123142 A1 | 6/2005 | Freeman et al. | |
| 2005/0246292 A1 * | 11/2005 | Sarcanin | ......................... 705/67 |
| 2006/0159269 A1 | 7/2006 | Braun et al. | |

(Continued)

OTHER PUBLICATIONS

Thompson, Mary R., Abdelilah Essiari, and Srilekha Mudumbai. "Certificate-based authorization policy in a PKI environment." ACM Transactions on Information and System Security (TISSEC) 6.4 (2003): 566-588.*

Hunter, Brian. "Simplifying PKI usage through a client-server architecture and dynamic propagation of certificate paths and repository addresses." Database and Expert Systems Applications, 2002. Proceedings. 13th International Workshop on, pp. 505-510. IEEE, 2002.*

(Continued)

*Primary Examiner* — Kari Schmidt
(74) *Attorney, Agent, or Firm* — Henry Gabryjelski; Kate Drakos; Micky Minhas (57) ABSTRACT

A local area network server may issue security certificates to client devices on the network for two-way authentication across the network. The certificates may be issued through a transaction performed over the network and, in some cases, may be automated. The server may have a self signed or a trusted security certificate which may serve as a basis for issuing certificates to various clients. After a certificate is issued, future communications on the network may be authenticated by both the server and client, and the communications may be encrypted using the certificates.

15 Claims, 4 Drawing Sheets

(56) References Cited

U.S. PATENT DOCUMENTS

| | | | |
|---|---|---|---|
| 2006/0168161 A1* | 7/2006 | Adelman et al. | 709/220 |
| 2006/0294366 A1* | 12/2006 | Nadalin et al. | 713/156 |
| 2007/0055882 A1 | 3/2007 | Gaucas et al. | |
| 2007/0127721 A1 | 6/2007 | Atallah et al. | |
| 2008/0016348 A1* | 1/2008 | Craft et al. | 713/168 |
| 2008/0056501 A1* | 3/2008 | McGough | 380/281 |
| 2009/0055642 A1* | 2/2009 | Myers et al. | 713/155 |
| 2009/0319783 A1* | 12/2009 | Thornton et al. | 713/156 |

OTHER PUBLICATIONS

"PKI Services for z/OS", IBM, pp. 1-2.

Evans, et al., "Private Key Infrastructure: Balancing Computer Transmission Privacy with Changing Technology and Security Demands", Computer Standards & Interfaces, vol. 27, Issue 4, Apr. 2005.

* cited by examiner

SECURITY MECHANISM WITHIN A LOCAL AREA NETWORK

BACKGROUND

Security certificates may be used by computer systems to authenticate and encrypt data transmitted to and from the system. A security certificate may define some level of trust that a client device may have in a system or server that has such a certificate. The level of trust in a certificate may be verified by various manners by the organization that issues a certificate, sometimes referred to as a certification authority.

In general, trusted security certificates that are used for two-way authentication are not usually delivered over a network to an unauthenticated device. In many cases, a certificate issuer may use a secondary channel, such as through postal mail, currier, or some other mechanism to ensure that the certificate is delivered to the actual person or organization that requested the certificate. The secondary channel may be the mechanism by which authentication of the issued certificate is verified.

In a typical use scenario, a trusted security certificate may be used for one-way authentication. For example a website on the Internet may have a trusted security certificate that may authenticate the website so that consumers may feel comfortable making a purchase or performing other actions with the website.

SUMMARY

A local area network server may issue security certificates to client devices on the network for two-way authentication across the network. The certificates may be issued through a transaction performed over the network and, in some cases, may be automated. The server may have a self signed or a trusted security certificate which may serve as a basis for issuing certificates to various clients. After a certificate is issued, future communications on the network may be authenticated by both the server and client, and the communications may be encrypted using the certificates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A system for deploying and using security certificates within a local area network may issue security certificates to client devices on the local area network. The security certificates issued to the client devices may be used to authenticate the client devices to a server within the local area network.

The client's security certificates may be issued by the server based on the fact that the client is connected to the local area network and, in some cases, may not use any other secondary authentication. In other cases, some parameter that identifies a client, such as a client globally unique identification (GUID), may be transmitted or a network password may be used.

The interaction between the client and server during the course of the initial communication and establishment of security certificates may be fully automated in some embodiments. Such embodiments may be useful in a small business or home environment where an administrator or lay person has personal knowledge or tangible evidence that the client and server are both connected to the network and are authentic. The person performing the setup in such a case may serve as the authentication mechanism that may instill trust in the security certificates.

After the security certificates are installed on various clients within the network, the clients may use the security certificates to authenticate the clients to the server as well as establish secure communications across the network. Devices that may be infiltrate the network, such as a wireless device that may intentionally or inadvertently establish a connection with the network, may be identified as unauthenticated and may be given restricted access or no access to various functions on the network.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
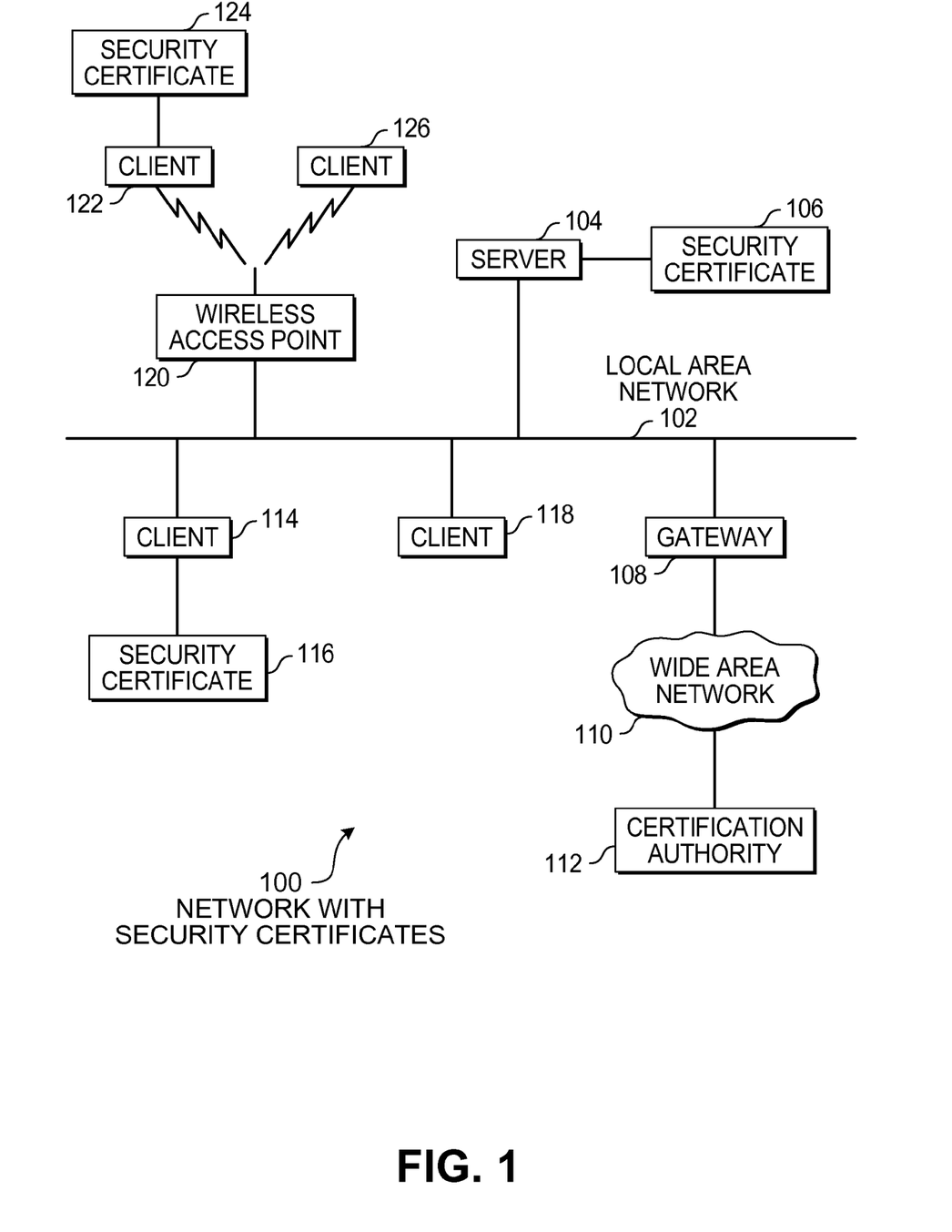
FIG. 1 is a diagram illustration of an embodiment showing a network with security certificates.

FIG. 1 is a diagram of an embodiment 100 showing a network with security certificates. Embodiment 100 is a simplified example used to highlight various characteristics, features, and uses of security certificates within a local area network.

The diagram of FIG. 1 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 100 illustrates a local area network 102 that may have a server 104 and several client devices. In a typical embodiment, the local area network 102 may be in a home, small business, department of a larger organization, or other location.

The server 104 may have or may create a master security certificate 106 from which the server 104 may issue other security certificates. When the server 104 issues a security certificate to a client device, the client may use the security certificate for authenticating that the client device is the device it claims to be, and not a different device masquerading as the client device. The process of authenticating may ensure that interlopers are not attempting to steal data, and may also be used for various other reasons.

Clients may authenticate themselves to a server in a local area network for security reasons and for other reasons as well. For example, a server may monitor and issue licenses to various clients. Each client may have separate set of software or service licenses assigned to the client and an authentication mechanism may enable a server to properly track the licenses and restore licenses to authenticated clients in various situations.

Security certificates may also be used for encrypted communication between devices. In many embodiments, a security certificate such as Secure Socket Layer (SSL) security certificate may comprise a public key and a private key that may be used to encrypt and authenticate transmissions.

When sending device creates an encrypted message using its private key, any receiving device may be able to decrypt the message using the sending device's public key. In this manner, the message may be verified that the message was created by the sending device and no other. This technique authenticates the sending device.

When a sending device signs a message for a receiving device using the receiving device's public key, the receiving device may be able to decrypt the message using the receiving device's private key. Since no other device has the receiving device's private key, no other device may be able to decrypt the message. In this manner, the message may be transmitted in a secure fashion.

For mutual or two-way authentication, each device may use its public key and private key to authenticate the communication. Two-way authentication is possible when both devices in the communication have a security certificates trusted by the other side.

In a local area network use scenario, a server device may authenticate itself to various client devices so that the client devices may trust the data or information coming from the server. The server may request authentication from various client devices to ensure that data requests are from legitimate sources, licenses and software are distributed to authorized devices, and that other services are being used by properly authorized and legitimate devices.

In some embodiments, the security certificate 106 may be issued by a certification authority 112. A certification authority 112 may be a trusted organization that verifies or vouches for the legitimacy or authenticity of a device to which a security certificate 106 is issued. When a client device 118, for example, receives a secure transaction request from the server 104 using the security certificate 106, the client device 118 may request verification of the security certificate 106 from the certification authority 112. The level of trust in the security certificate 106 may be based on the level of trust for the certification authority 112.

The certification authority 112 may be contacted through a gateway 108 that may enable access to a wide area network 110. The wide area network 110 may be the Internet or other network through which the certification authority 112 may be contacted.

In some embodiments, the security certificate 106 may be a self-signed or privately issued certificate. A self-signed certificate may be a certificate for which no authentication would be provided through any other source. Self-signed certificates may be used for cases where the authenticity of the server 104 is not provided through third parties. For example, a self-signed security certificate on a website may not be trusted by a consumer who may wish to perform a credit card transaction or enter personal data.

On the local area network 102, a sever 104 may provide various services and functions to client devices. Client device 114 may have a security certificate 116 and may use the security certificate 116 to authenticate the client 114 to the server 106. Similarly, the server 104 may use the security certificate 106 to authenticate the server 104 to the client 114. By having a security certificate 116 issued to the client 114, two-way authentication may be possible.

In contrast, the client 118 may not have a security certificate. In a communication with the server 104, the server 104 may be able to authenticate itself to the client 118, but the client 118 may not be able to authenticate itself to the server 104. In such a case, a password, key card, or some other authenticating mechanism may be used to authenticate the client 118 to the server 104.

In many embodiments, the security certificate 116 on the client 114 may be used within the bounds of the local area network 102. The security certificate 116 may be issued by the server 104 using the authority of the security certificate 106. The server security certificate 106 may be a master certificate through which client security certificates may be generated. Such client security certificates may be traced back to the server security certificate for authentication and trust.

When the server security certificate 106 is self-signed, the level of trust in the client security certificate 116 may be limited to that of the self-signed sever security certificate 106. Self-signed security certificates generally have low trust, as a certification authority 112 may not verify that the self-signed security certificates are trustworthy.

In a small network environment, such as a home network or a small business network, an administrator that sets up the network may be able to personally verify that the server 104 is indeed the server on the network and that the client 114 is indeed the client attached to the network. In such a case, the human administrator may inherently trust the two devices and may configure the security certificates using the server security certificate 106 as a self-signed certificate. For the administrator's purposes, the client security certificate 116 and the server security certificate 106 may be fully trusted, as the administrator may have personally verified, either expressly or impliedly, that the devices are authentic.

The client 114 may be configured with a security establisher application or setup routine that may communicate with the server 104 over the local area network 102 to request and download the client security certificate 116. The server 104 may generate the client security certificate 116 and transmit the client security certificate 116 over the local area network 102 to the client 114. The client 114 may then install the client security certificate 116 and use the security certificate 116 to authenticate itself to the server 104. Also, because the client security certificate 116 is signed using the security certificate 106, the client 114 may verify the identity of the server 104.

In many embodiments, a wireless access point 120 may be used to connect to wireless devices, such as clients 122 and 126. The wireless devices may be devices such as laptop computers, handheld devices, voice over IP (VoIP) telephony devices, mobile phones with a wireless data connection, or other devices. In some cases, a wireless access point 120 may be detected by unwanted interlopers that may attempt to access various network services, including access to a wide area network 110 such as the Internet.

When a client 122 has a security certificate 124 that is issued by or trusted by the server 104, the client 122 may be given access to various server functions or other network functions. When a client 126 does not have a security certificate that is recognized by the server 104, such access may be denied.

Figure 2:
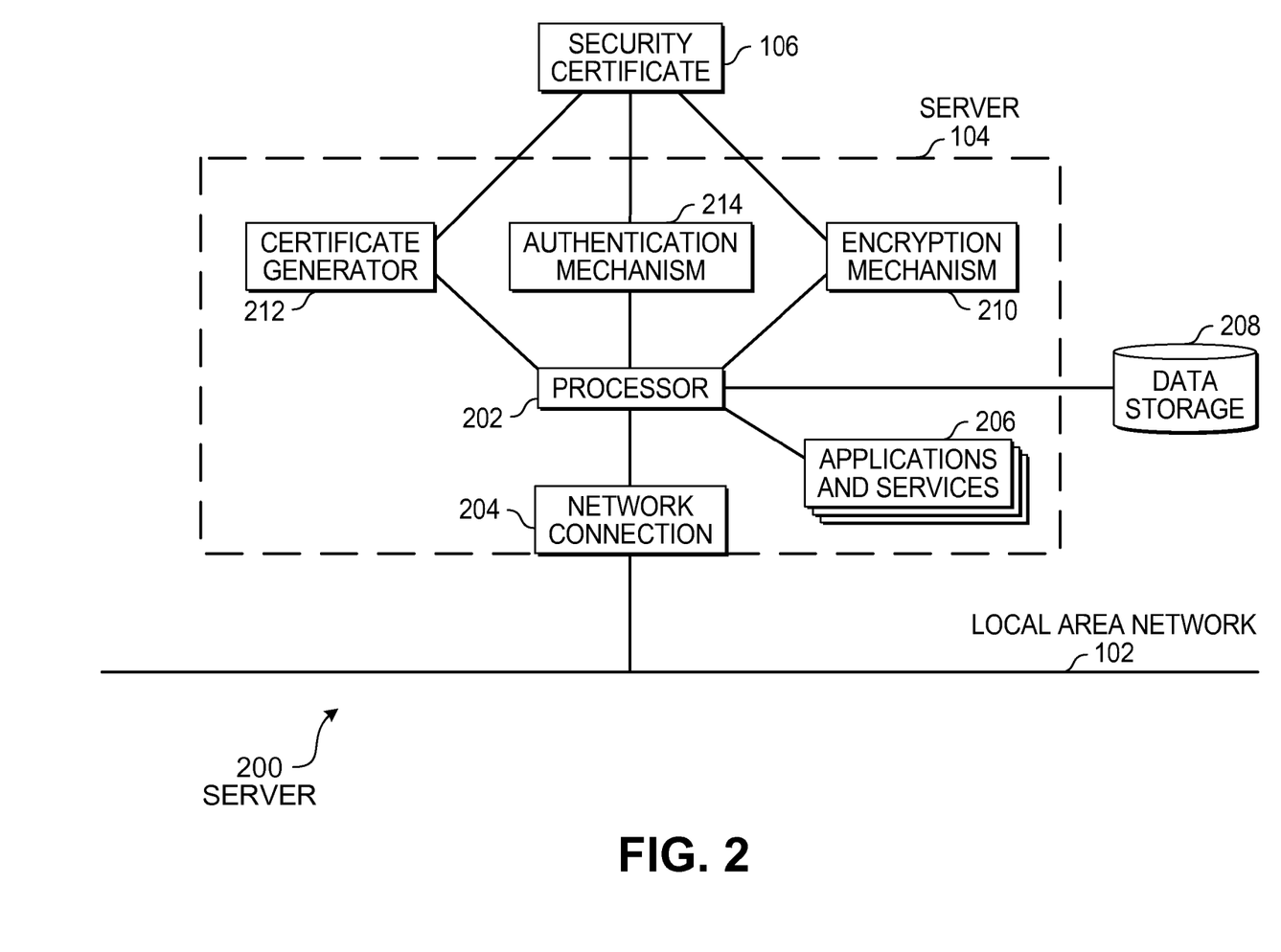
FIG. 2 is a diagram illustration of an embodiment showing a server with security certificates.

FIG. 2 is a diagram illustration of an embodiment 200 showing a functional view of the server 104. Embodiment 200 is a simplified example used to highlight various characteristics, features, and uses of a server with a security certificate.

The diagram of FIG. 2 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 200 is a functional illustration of the server 104. The server 104 may have a processor 202 connected to a network connection 204 and may provide various services and functions to client devices or other devices connected to the local area network 102. For example, the server 104 may execute various applications and services 206 and may provide access to data storage 208 or other peripherals.

In some embodiments, some of the applications or services 206 may operate with authenticated client devices. For example, a backup and restore application may be configured to backup a client hard disk on a regular basis, and may give a user the opportunity to restore a client device to a previous configuration. When executing the backup and restore service for the client device, the server 104 may use some form of client authentication to prevent the wrong data from being backed up or to prevent unauthorized access to specific backup data.

The server 104 may have several functional mechanisms that interface with the security certificate 106 in a network environment. These functional mechanisms include an encryption mechanism 210, an authentication mechanism 214, and a certificate generator 212. The encryption mechanism 210 and authentication mechanism 214 may be uses of the security certificate 106 in various forms of communication. The encryption mechanism 210 may, for example, encode and decode HTTPS or other security protocols when sending or responding to queries.

In many embodiments, the functions of the authentication mechanism 214 and the encryption mechanism 210 may be intertwined. For example, by encrypting a transmission using a private key from the security certificate 106 may serve as both an encryption mechanism 210, since the message is encrypted, and authentication mechanism 214 since only the server 104 may be able to encrypt data using the private key in the security certificate 106.

The encryption mechanism 210 may also be configured to decrypt incoming messages using the private key within the security certificate 106 or using another device's public key. In a two-way authentication, an incoming message may be encrypted twice: once with the server's public key and a second time with the sender's private key. In such a case, the message may be decrypted by the server 104 using its private key and may authenticate that the message is transmitted from the specific sender.

The certificate generator 212 may be a function that generates a child certificate based on the server security certificate 106. The security certificate 106 may be configured as a master certificate from which other, dependent security certificates may be issued. Such security certificates may be generated for clients connected to the local area network 102.

Figure 3:
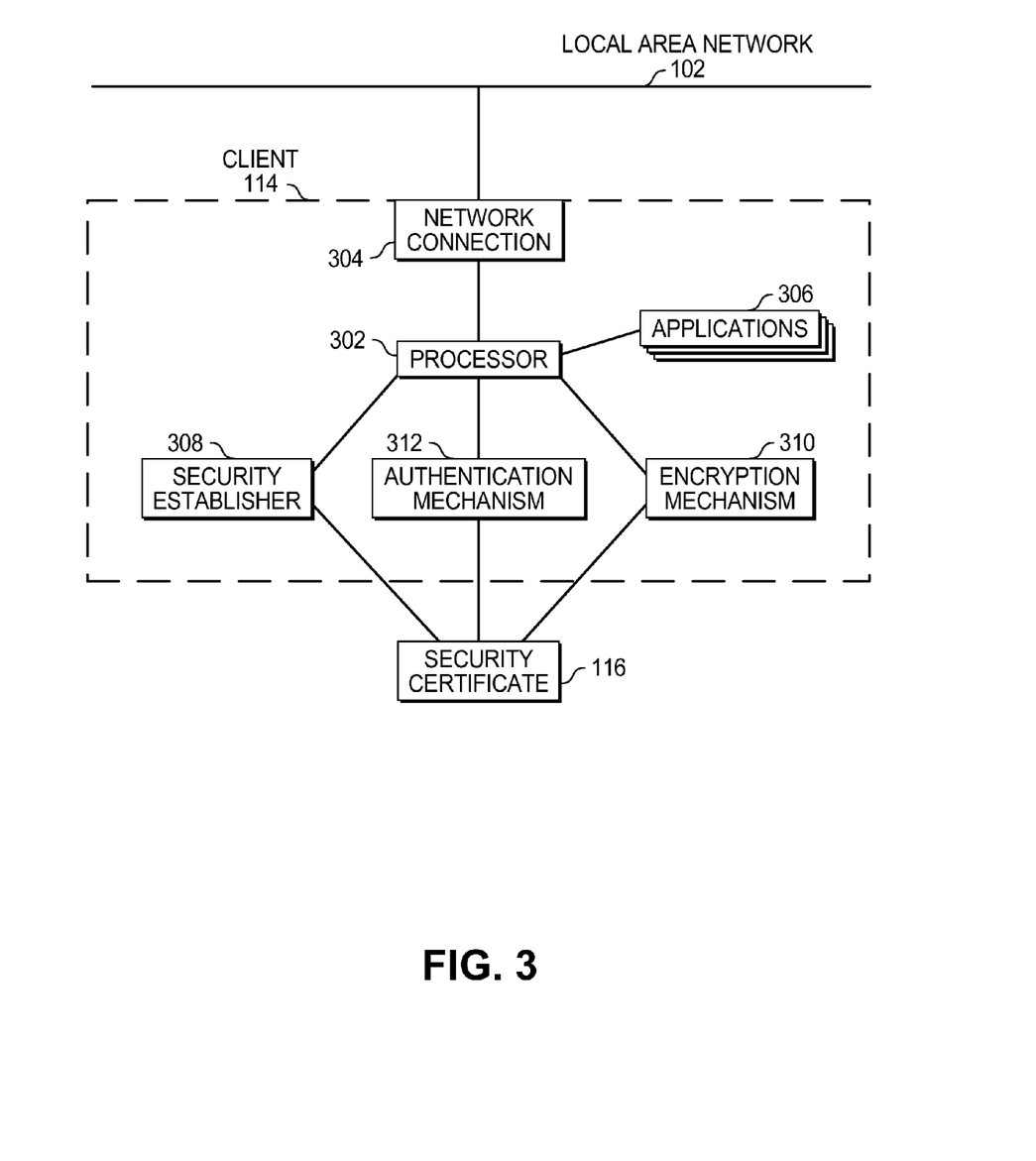
FIG. 3 is a diagram illustration of an embodiment showing a client with security certificates.

FIG. 3 is a diagram illustration of an embodiment 300 showing a client 114 that has a security certificate 116. Embodiment 300 is a simplified example used to highlight various characteristics, features, and uses of a client with a security certificate.

The diagram of FIG. 3 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 300 is a functional diagram of the client 114 with the security certificate 116. The client 114 may have a processor 302 connected to a network connection 304 and may execute various applications 306, some of which may communicate on the local area network 102 with other devices. For example, the applications 306 may include web browsers, application software such as database applications, file browsers, or other applications that may communicate with a server computer.

Many of the applications 306 may use the security certificate 116 to authenticate the client 114 as well as encrypt and decrypt communications made through the network connection 304. The security certificate 116 may be used by an encryption mechanism 310 and an authentication mechanism 312 in various communications. The encryption mechanism 310 and authentication mechanism 312 may operate in a similar way to the encryption mechanism 210 and authentication mechanism 214 for the server 104 as illustrated in FIG. 2. As with the server 104, the authentication mechanism 310 and encryption mechanism 310 may be different functional effects of the use of a private key/public key security certificate.

The client 114 may have a security establisher 308 that may perform various functions to obtain, install, and operate the security certificate 116.

The security establisher 308 may establish a connection with a server, such as server 104 that is connected to the local area network 102. After establishing a connection, the security establisher 308 may request a security certificate from the server. The server may generate a security certificate and transmit the security certificate to the client 114, where the client 114 may install the security certificate 116.

The security establisher 308 may perform the process of requesting and installing the security certificate 116 without user interaction in some embodiments. A user may cause an installation routine to be initiated, but the installation routine may perform the steps of requesting and installing the security certificate 116 without further interaction. In some embodiments, the user may not realize that the security certificate 116 was installed.

When the client 114 is connected to the local area network 102 and makes a request to a server 104 also connected to the local area network 102, a security certificate 116 may be obtained and used to authenticate the client 114 without a secondary authentication mechanism. The client 114 may be authenticated to the server because the administrator or user who initiated the process to obtain the security certificate 116 had personal knowledge that the client 114 and server 104 were the devices communicating with each other. An embodiment 400 of the communications between a client 114 and server 104 during such an exchange is presented in FIG. 4.

Figure 4:
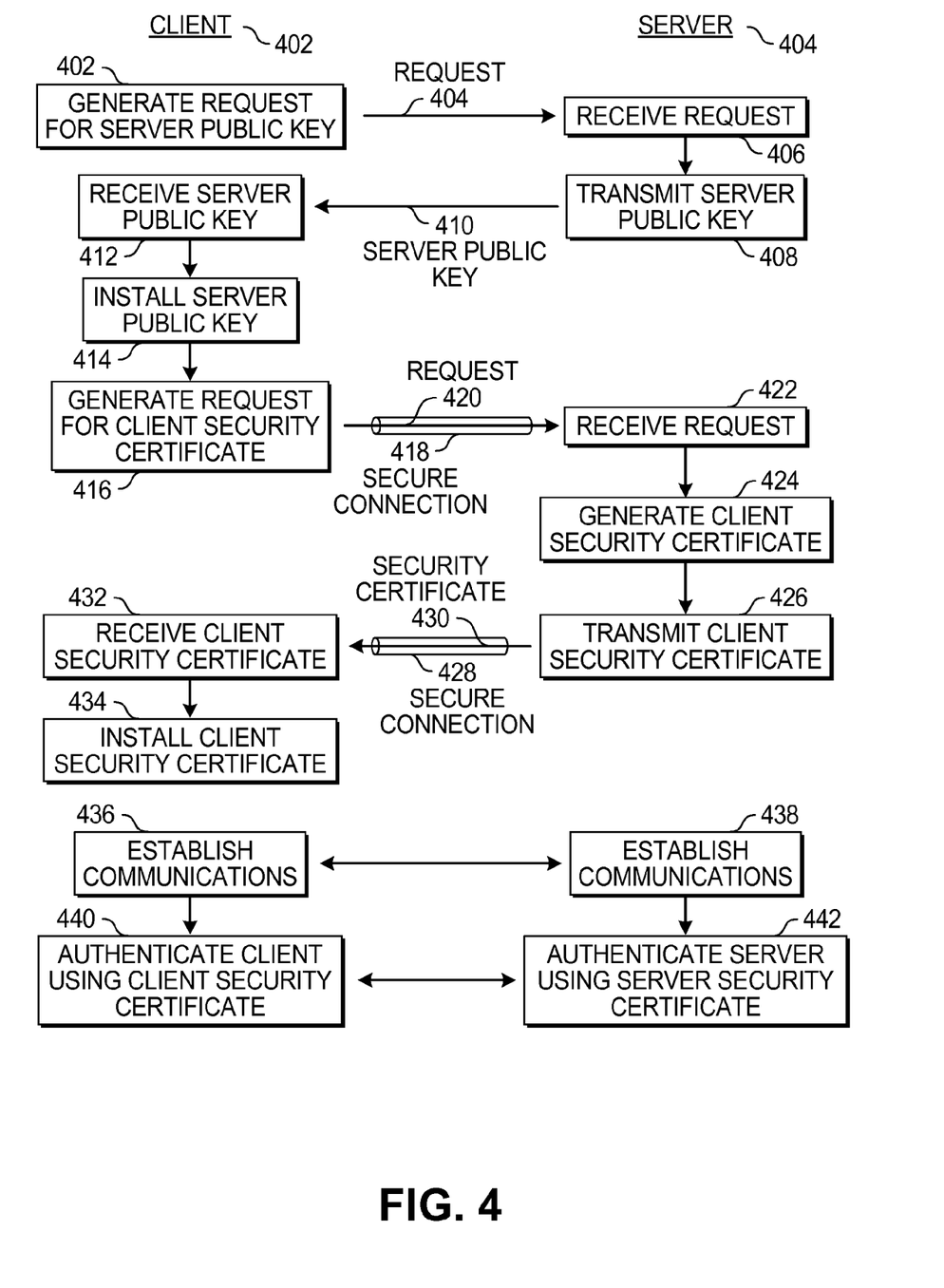
FIG. 4 is a timeline illustration of an embodiment showing a client and server interaction for the creation, installation, and use of client and server security certificates.

FIG. 4 is a timeline illustration of an embodiment 400 showing the interaction between a client 402 and a server 404 for the generation, installation, and use of a client security certificate. Embodiment 400 is a simplified example of a sequence of steps that may be used to request, install, and use a client security certificate. Other embodiments may use different terminology or nomenclature and may include additional steps or may combine two or more steps into a single step. In other embodiments, some steps illustrated as serial may be performed in parallel and vice versa.

Embodiment 400 is an example of the interactions between a client 402 and a server 404. In some embodiments, the actions of the client 402 may be performed by a security establisher 308 of a client 114.

The actions of the client 402 are illustrated on the left side of the illustration and the actions of the server 404 are illustrated on the right side.

The client 402 may establish a communication channel and generate a request for a server public key in block 402. The server public key may be a public key portion of a server security certificate. The request 404 is transmitted in block 402 and received in block 406. The server 404 may transmit the server public key 410 in block 408.

The server public key may be received in block 412 and may be installed in block 414. The server public key may be used by the client 402 to encrypt messages being sent to the server 404. The encryption may be made with the server public key so that the server 404 may be the only device capable of decoding the message.

The client 402 may generate a request for a client security certificate in block 410 and may send the request 420 using a secure connection 418. The secure connection 418 may comprise using the server public key to encrypt the request 420.

The request for a client security certificate may include a GUID, password, or some other authenticating mechanism. In some embodiments, no authenticating mechanism may be used for the request 420.

The request may be received in block 422 and a client security certificate may be generated in block 424. The client security certificate may be generated using a master security certificate on the server 404. The client security certificate may be signed by the server 404 and verified by the server 404.

In many embodiments, the server security certificate may be a self-signed or privately issued security certificate. A self-signed security certificate may not be verified by a certification authority and a device that receives a communication generated under a self-signed security certificate may have a low level of trust in the communication. However, when the self-signed security certificate is created and used within a local area network where a user or administrator has control and trust in the authentication of the devices on the network, the users of the self-signed security certificate and other security certificates derived from the self-signed security certificate may have full trust in the communications.

The client security certificate 430 may be transmitted in block 426 using a secure connection 428. The secure connection 428 may be similar to the secure connection 418 and may use a server public key from the server security certificate.

The client security certificate may be received in block 423 and installed in block 434. The client security certificate may comprise a client private key and a client public key. The client private key may be kept private and used to decode messages created with the client public key. In such a manner, another device may be able to send a message to the client 402 that can be read by the client 402 but no other device.

In blocks 436 and 438, the client 402 and server 404 may establish communications. In block 440, the client 402 may authenticate itself to the server 404 using the client security certificate. In order to authenticate the client 402 to the server 404, the client 402 may create a message that is encrypted using the client private key. The server 404 may decrypt the message using the client public key and may thereby determine that the message was indeed sent from the client and thus the client 402 may be authenticated.

Similarly, the server 404 may create a message encrypted using the server private key, and the server 404 may be authenticated when the client 402 may decrypt the message using the server public key.

The client 402 and server 404 may establish a communications session where each device authenticates itself to the other. In such a manner, two way communications may have the benefit of encryption, but also the assurance that each device is authentic and not an imposter.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method, comprising:
   sending, from a client device, a first request to a server, the first request comprising a request for a server public key associated with the server;
   in response to sending the first request, receiving, at the client device, the server public key from the server;
   using the received server public key to establish a secure communication channel for the client device with the server within a local area network, wherein establishing the secure communication channel includes encrypting, at the client device, a second request to the server for a client security certificate using the received server public key from the server;
   sending, from the client device, the encrypted second request to the server for the client security certificate using the secure communication channel;
   in response to sending the encrypted second request and without providing any further authentication in addition to sending the encrypted second request using the secure communication channel within the local area network established for the client device with the server, receiving, at the client device, the client security certificate from the server wherein the security certificate is a self-signed certificate; and
   installing the received security certificate on the client device.

2. The method of claim 1 wherein the server public key is issued based on a server security certificate, and wherein the server security certificate is used to generate the client security certificate.

3. The method of claim 1, further comprising:
   using the client security certificate for authenticating the client device with the server.

4. The method of claim 1, further comprising:
   using the client security certificate for encrypting a communication with the server.

5. The method of claim 1 wherein installing the security certificate on the client device includes installing the security certificate on the client device without user interaction.

6. A method, comprising:
   receiving, from a client device, a first request to a server, the first request comprising a request by the client device for a server public key associated with the server;
   in response to receiving the first request, sending the requested server public key from the server to the client device;
   receiving, from the client device, a second request to the server for a client security certificate, the received second request being encrypted at the client device using the server public key sent from the server to the client device;
   in response to receiving the encrypted second request and without providing any further authentication in addition to the client device sending the encrypted second request, encrypting the requested client security certificate and sending the encrypted client security certificate from the server to the client device to be installed on the client device;
   receiving a communication from the client device, the communication being encrypted using the client security certificate; and
   using the client security certificate for decrypting the received communication.

7. The method of claim 6 wherein the server public key is issued based on a server security certificate, and wherein the server security certificate is used to generate the client security certificate.

8. The method of claim 7 wherein the server security certificate is a self-signed certificate.

9. The method of claim 6, further comprising authenticating the client device using the client security certificate.

10. The method of claim 6 wherein the requested client security certificate from the server to the client device is to be installed on the client device without user interaction.

11. The method of claim 6, further comprising in response to receiving the encrypted second request, decrypting the received second request using a server private key and sending the requested client security certificate from the server to the client device to be installed on the client device based on the decrypted second request.

12. A computing server, comprising:
   a processor and a memory containing instructions that when executed by the processor, cause the processor to perform a process comprising:
      receiving, from a client device, a first request comprising a request by the client device for a server public key associated with the computing server;

in response to receiving the first request, transmitting the requested server public key to the client device;

receiving, from the client device, a second request to the computing server for a client security certificate, the received second request being encrypted at the client device using the server public key transmitted from the computing server to the client device;

in response to receiving the encrypted second request and without providing any further authentication in addition to the client device sending the encrypted second request, encrypting the requested client security certificate and transmitting the encrypted client security certificate to the client device to be installed on the client device;

receiving a communication from the client device, the communication being encrypted using the client security certificate; and using the client security certificate for decrypting the received communication.

13. The computing server of claim 12 wherein the server public key is issued based on a server security certificate, and wherein the server security certificate is used to generate the client security certificate.

14. The computing server of claim 12 wherein the requested client security certificate from the server to the client device is to be installed on the client device without user interaction.

15. The computing server of claim 12 wherein the process performed by the processor further comprises in response to receiving the encrypted second request, decrypting the received second request using a server private key and sending the requested client security certificate from the server to the client device to be installed on the client device based on the decrypted second request.

* * * * *